Feb. 10, 1953 — B. B. HOLMES — 2,627,866
DEMAND REGULATOR
Filed April 6, 1943 — 5 Sheets-Sheet 2
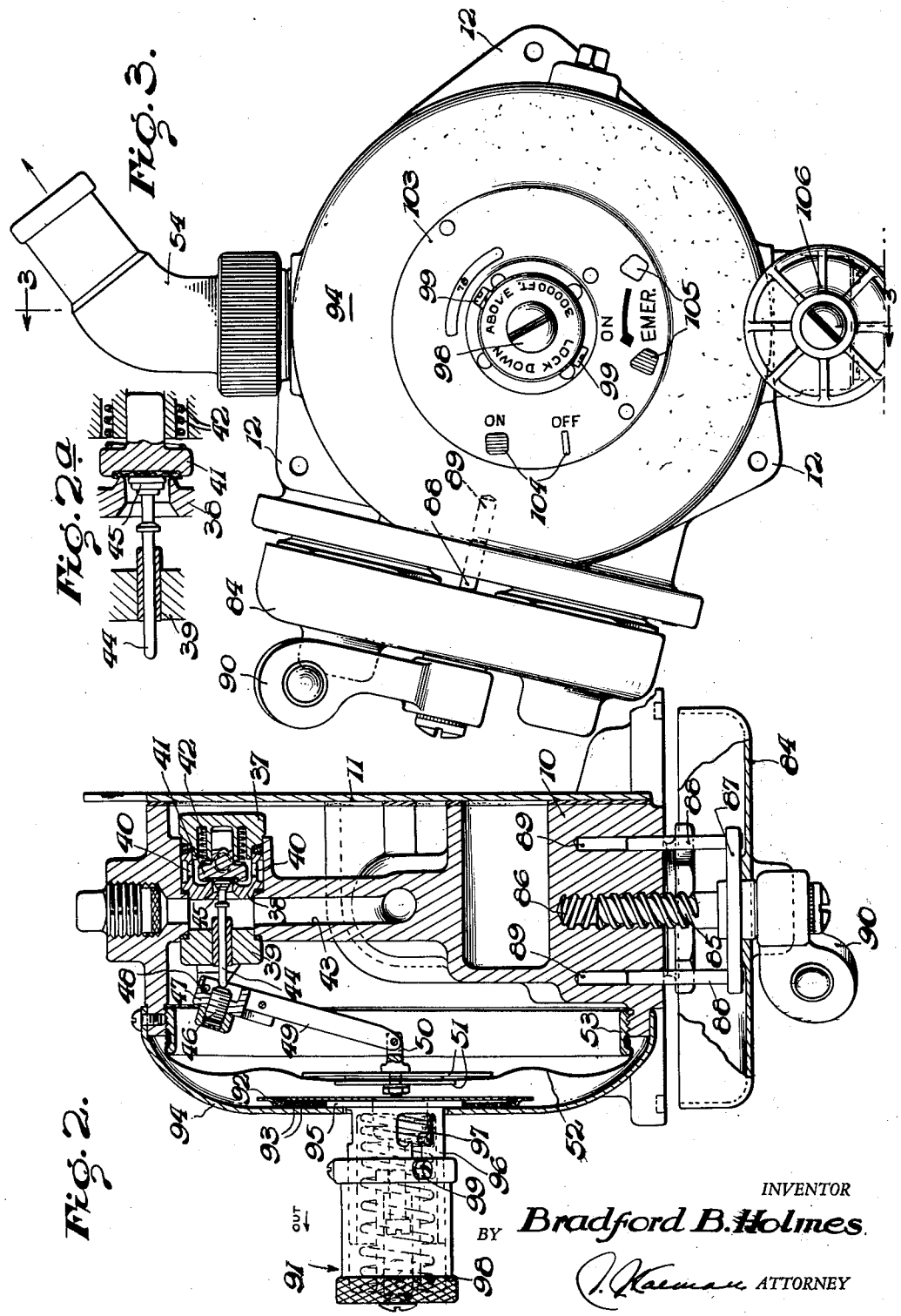
INVENTOR
Bradford B. Holmes
BY
ATTORNEY Feb. 10, 1953 B. B. HOLMES 2,627,866
DEMAND REGULATOR
Filed April 6, 1943 5 Sheets-Sheet 3

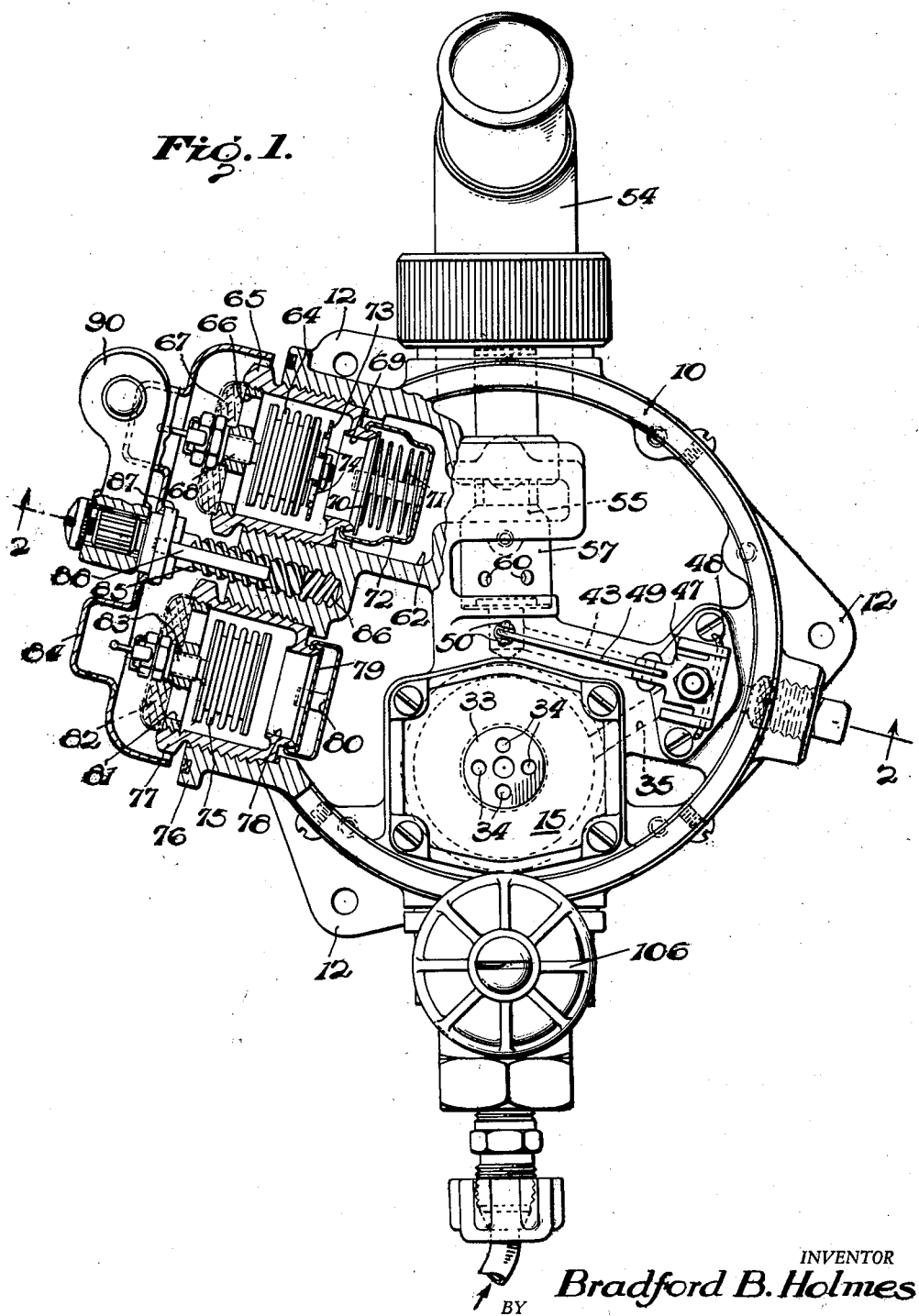

INVENTOR
Bradford B. Holmes
BY
ATTORNEY

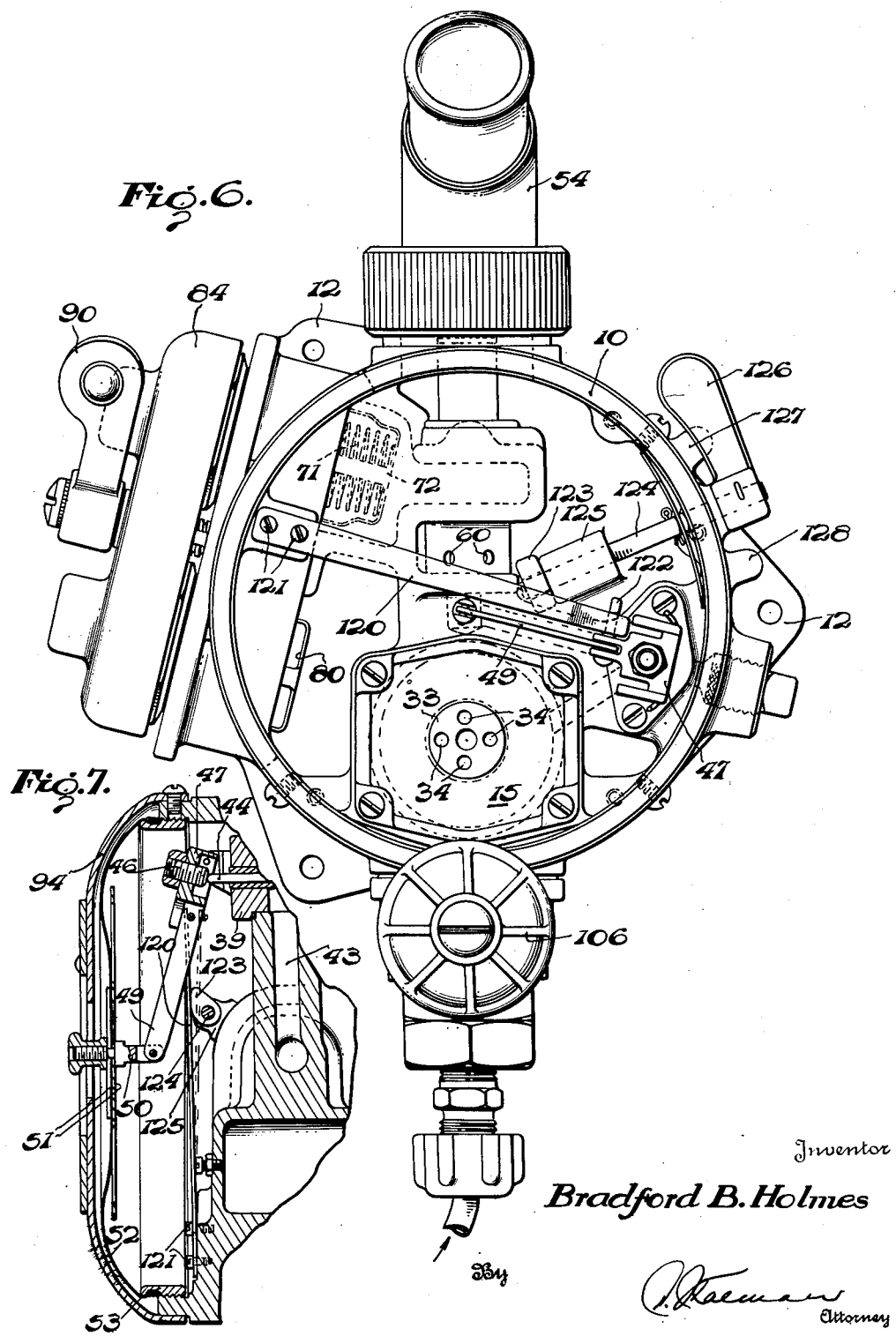

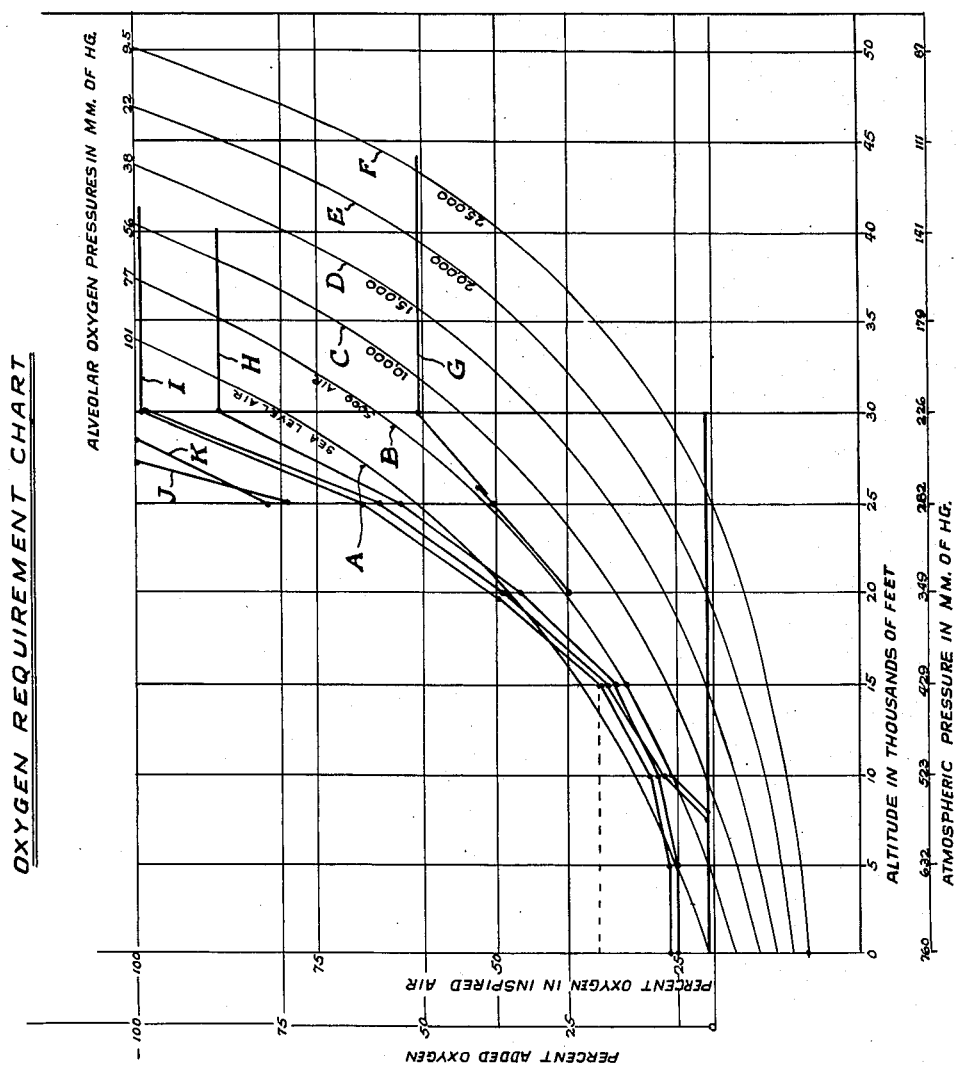

UNITED STATES PATENT OFFICE 2,627,866

DEMAND REGULATOR

Bradford B. Holmes, New York, N. Y., assignor to Bendix Aviation Corporation, Bendix, N. J., a corporation of Delaware Application April 6, 1943, Serial No. 482,016

24 Claims. (Cl. 137—64)

This invention relates to respirant gas regulators generally, and more particularly to the demand type oxygen regulators for use by aviators traversing high altitudes.

An object of the present invention is to provide a novel oxygen regulator of the demand type which is adapted to supply a mixture of air and oxygen, or oxygen alone, to a respiratory mask. The mixture of air and oxygen so supplied will approximate the alveolar oxygen tension corresponding to sea level air, 5,000 ft. air, or any desired modification thereof and this is accomplished automatically as regards altitude, tank pressure, individual demand and over any temperature range encountered in service.

Another object is to provide a novel demand type oxygen regulator which will supply air only at relatively low altitudes during which time no oxygen is required thereby conserving the oxygen until such time as the aviator is in actual need of an artificial supply of oxygen in the inspired air.

A further object of the present invention is to provide an improved demand type oxygen regulator in which a mixture chamber communicates with the atmosphere through automatically operative means which variably control the percentage of air entering the mixture chamber in accordance with the flight altitude and which closes off the air flow to the chamber at a predetermined altitude.

Another object is to provide an improved demand type regulator with novel means which compensate for the effect of mask leakage occurring at excessively high altitudes.

A still further object is to provide an improved demand type regulator having a first novel control for supplying air only up to a first predetermined altitude, a second control for supplying an air-oxygen mixture up to a second predetermined altitude, and a third control acting independently of suction applied at the regulator outlet to supply oxygen alone to the consumer at altitudes exceeding the second predetermined altitude.

The above and further objects and novel features of the invention will more fully appear from the following detailed description when the same is read in connection with the accompanying drawings. It is to be expressly understood, however, that the drawings are for the purposes of illustration only and are not intended as a definition of the limits of the invention.

In the drawings, wherein like reference characters refer to like parts throughout the several views;

Figure 1 is a side elevation view, partially in section, of the improved demand type oxygen regulator of the present invention with its cover removed;

Figure 2 is a section view taken substantially along line 2—2 of Figure 1;

Figure 2a is an enlarged detail view of a portion of the structure of Figure 2;

Figure 3 is a side elevation view of the device of Figure 1 with the cover attached;

Figure 6 is a slightly modified form of the present invention;

Figure 7 is a fragmentary sectional view of a portion of the regulator of Figure 6; and, Figure 8 illustrates a set of curves representing the results obtained with the use of the demand regulator of the present invention with reference to a standard oxygen requirement chart.

Figures 4, 5:
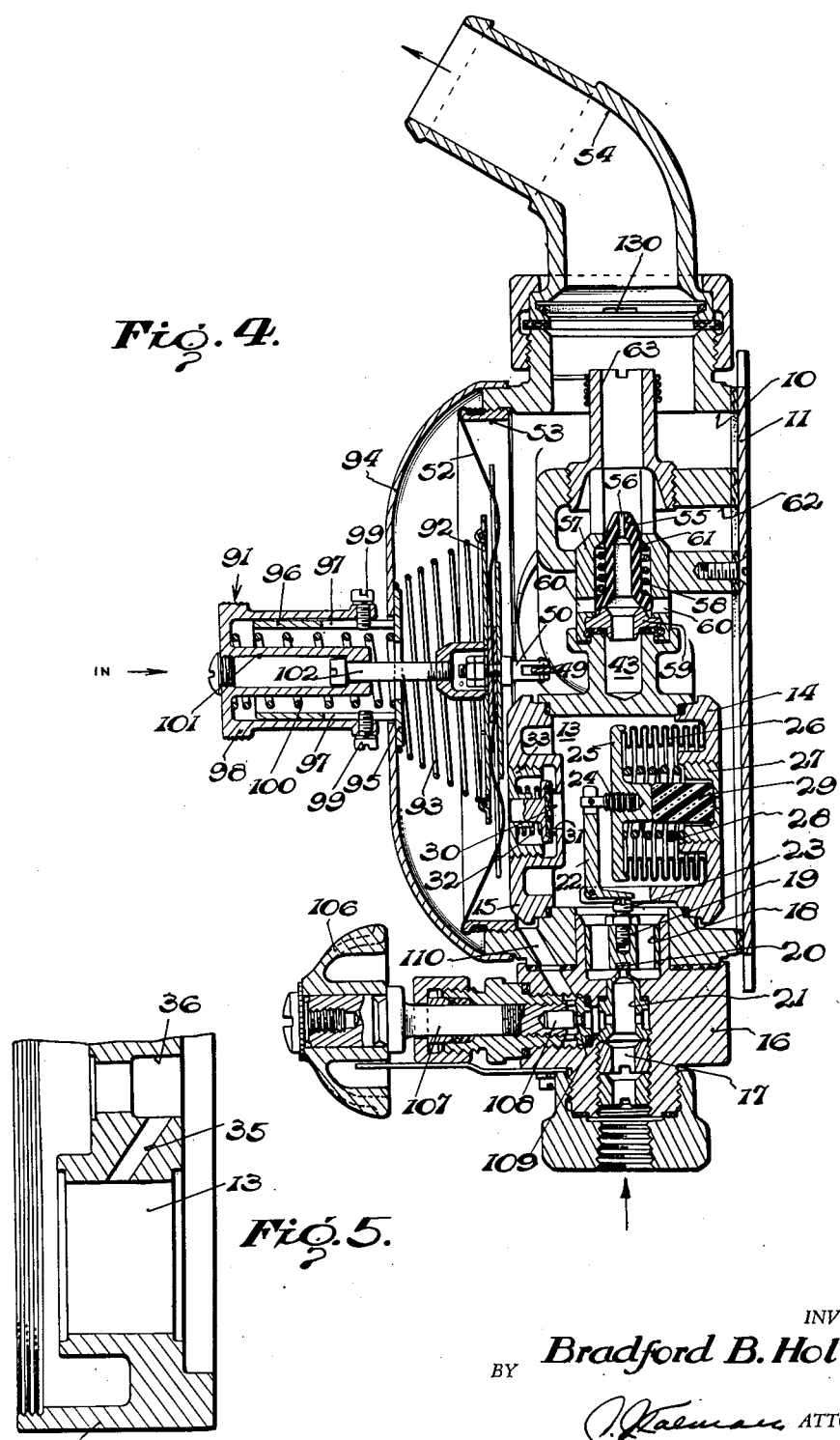
Figure 4 is a section view taken substantially along line 3—3 of Figure 3.
Figure 5 is a fragmentary detail view of a portion of the regulator of Figure 1.

In aerial flights exceeding altitudes of eight to ten thousand feet, it is a known fact that insufficient oxygen is present in the air corresponding to those altitudes so that an artificial supply of oxygen must be provided to maintain the alveolar oxygen pressure equivalent to inspired air at sea level, for example. An oxygen requirement chart has been drawn up by the National Bureau of Standards, shown in Figure 8 of the drawings, which illustrates the percentage of oxygen necessary in the inspired air mixture at varying altitudes to maintain an alveolar oxygen pressure of sea level air, 5,000 ft. air, etc., as well as the amount of artificially supplied oxygen that must be added to the inspired air at the various altitudes to maintain the desired alveolar oxygen pressure.

Referring to the chart, curve A represents the percentage of oxygen in the inspired air mixture necessary at various altitudes in order to maintain an alveolar oxygen pressure of roughly 101 mm. of Hg equivalent to the alveolar oxygen pressure of sea level air, while curves B, C, D, E. and F represent the percentages of oxygen necessary in inspired air to maintain alveolar oxygen pressures of roughly 77 mm. of Hg. 56 mm. of Hg, 38 mm. of Hg, 22 mm. of Hg, and 9.5 mm. of Hg, respectively, which are equivalent to the alveolar oxygen pressures of inspired air at elevations of 5,000 ft., 10,000 ft., 15,000 ft., 20,000 ft., and 25,000 ft.

If, for example, it is desired to maintain, at an altitude of 21,000 feet an alveolar oxygen pressure of 101 mm. of Hg, corresponding to the alveolar oxygen pressure of inspired air at sea level, curve A of Figure 8 is referred to and it is found that the primary ordinate, corresponding to 21,000 feet altitude for this curve, indicates that the percentage of oxygen in the inspired air should be somewhere around 50%. In order to maintain such a mixture, the secondary ordinate is referred to and, from it, it is found that approximately 37% of oxygen must be supplied from an artificial source of supply into the inspired air. In order to maintain, for the same altitude, an alveolar oxygen pressure of 77 mm. of Hg, (curve B) the percentage of oxygen in inspired air should be about 40% and such a mixture is obtainable by supplying only about 25% of oxygen. The novel regulator, presently to be described, automatically provides the necessary percentages of the air-oxygen mixture for various altitudes whereby the desired alveolar oxygen pressure will be reliably maintained at all times.

Referring now to the drawings for a more detailed description of the present invention and more particularly to Figure 1 thereof, the operating mechanism of the regulator is mounted within a suitable and preferably cylindrical hollow casing 10, one end of which is sealably closed by way of a closure plate 11, better shown in Figure 4, having apertured lugs 12 thereon (Figure 1) adapting the unit for mounting upon a wall of a craft to be used in traversing high altitudes.

Casing 10 is constructed from any suitable moulded plastic material and has formed, preferably, integrally therewith a series of chambers, one of which defines a pressure reduction chamber 13, one end of the latter being provided with an apertured closure plate 14 and the other end being provided with a second apertured plate 15. The lower side of casing 10, defining a common wall for the pressure reduction chamber, is apertured for the reception of a boss 16 which is formed with a central passage 17 communicating the interior of reduction chamber 13 with a suitable oxygen supply source (not shown).

The valve controlling communication between the pressure reduction chamber and the oxygen supply source is probably the most vital part of any regulator and is the point where the greatest trouble occurs. The conventional valve heretofore used for this purpose consisted of a sharp-edged metal orifice or seat against which was pressed a flat piece of somewhat resilient material, such as, hard rubber, Lucite, polystyrene, etc. These essentials of a sharp edge and resilient material are generally needed so that a gas-tight seal against pressures up to 2,000 p. s. i. can be made with the minimum of pressure. Valves of the foregoing type, however, have short lives because the sharp metal edge gradually digs into the seat. As this occurs greater and greater pressure is required to close the valve with resulting increased deterioration of the material.

To the end of overcoming the foregoing difficulty, therefore, a novel plastic main inlet valve 18 is provided having a hollow annular body portion and a central rib 19, the latter being provided with a sharp-edged circular depression or recess 20 as better shown in Figure 4. Rigidly mounted within passage 17 is a hollow valve seat member 21 having an upper polished cone surface with which the sharp plastic edge of the valve cooperates so that sealing is obtained therebetween with a minimum amount of pressure.

Normally, valve 18 would be lifted from seat 21 by virtue of the relatively high pressure of the oxygen at the source. This is prevented, however, by way of a pivoted bell-crank 22 which engages at one of its ends with a bolt head 23 secured to the valve, and at its other end is connected through a threaded link 24 with a disc 25. One side of disc 25 is fastened to a collapsible bellows 26 and the opposite end of the bellows is secured to closure plate 14. A self-locking adjustment screw 27 is provided within the aperture of closure plate 14 and both the screw and disc 25 define abutments for a spring 28. Adjustment of screw 27 determines the pressure at which valve 18 is unseated and this follows because with a drop of pressure within chamber 13 below a pre-selected pressure as determined by the setting of screw 27, bellows 26 expands, pivoting bell-crank 22 into a counterclockwise direction, to release the holding force on the valve so that the latter is unseated permitting oxygen flow into the chamber until the pressure is sufficient to collapse the bellows and close the valve through the bell-crank. For a more detailed description of the structure and operation of screw 27 reference is made to the co-pending application S. N. 478,711, filed March 10, 1943, and assigned to the assignee of the present application, now U. S. Patent No. 2,394,104, issued February 5, 1946.

In devices of this nature, where large and varying automatically controlled gas flows occur into and out of chambers of small capacity, there is an inherent tendency of the parts to fluctuate, over control, vibrate or flutter. For this reason bellows 26 tends to vibrate with a high pitched musical note which, if uncontrolled, would quickly ruin the valve seat and bellows. It has been discovered that by interposing a soft rubber plug 29 between screw 27 and disc 25 the tendency to vibrate is completely eliminated. As shown in Figure 4 the soft rubber plug 29 is mounted in a central recess of screw 27 and contacts with a central protrusion extending from disc 25.

Should for some reason, some part of the pressure reducer fail to function, a pop-off valve is provided in the form of a piston-like valve 30 normally urged to a closed position with an apertured slot 31 by way of a spring 32. A plug 33 is provided within the aperture of plate 15 and defines a journal for the reduced stem of valve 30 and, furthermore, the plug is formed with a series of openings 34 (Figure 1) so that when the pressure within reduction chamber 13 exceeds a predetermined value, valve 30 is unseated to permit flow of oxygen from chamber 13 into casing 10 by way of openings 34 and thus relieve the pressure within the reduction chamber.

Pressure reduction chamber 13 communicates by way of a passage 35, better shown in Figure 5, with a chamber 36. As shown in Figure 2, one end of the latter chamber is sealably closed by a plug 37 while the opposite end receives a hollow cylinder 38 carried by an insert 39. The interior of cylinder 38 communicates with passage 35 by virtue of orifices 40 formed at its periphery while the end of the cylinder is provided with a valve seat opening which is normally closed by means of a demand valve 41 whose reduced stem is received by a bore formed within the plug, the valve being urged to such closed position by reason of a spring 42 acting thereon. The interior of cylinder 38 defines a demand chamber which is placed in communication with a passage 43 when demand valve 41 is unseated in a manner to presently appear.

A pushrod 44 is slidably mounted within a suitable bearing carried by insert 39 (Figure 2) and is provided at one of its ends with a button 45 adapted, under certain conditions, to move demand valve 41 to the right to an open position against the action of spring 42 and the gas pressure within cylinder 38. The opposite end of rod 44 is engaged by a stud 46 supported by a block 47 mounted for pivotal movement about a shaft 48. The free end of block 47 is connected through suitable means with an actuating lever 49 which is pivotally fastened to a link 50 carried by clamping discs 51 having interposed therebetween a flexible diaphragm 52, the outer periphery of which is fastened to a ring 53 received by the open end of casing 10 opposite plate 11.

Diaphragm 52 is termed a suction diaphragm, one side of which is in communication with the interior of casing 10 and an outlet 54 which is adapted for connection through suitable tubing with an oxygen mask (not shown) carried by the consumer. Thus, under certain conditions, with each inhalation diaphragm 52 is flexed inwardly whereupon lever 49 swings block 47 and stud 46 to urge push rod 44 and button 45 to unseat demand valve 41 and permit communication between the demand chamber and passage 43.

Passage 43 supplies an injector nozzle 55 (Figure 4) having an orifice 56 and mounted within a cylinder 57. A spring 58 is arranged within the cylinder to normally urge nozzle 55 into its lowermost position, as shown in Figure 4, against an apertured seat 59. As shown in Figure 1, cylinder 57 near its base is provided with a series of orifices 60 so that when more oxygen is required than that which can flow through nozzle orifice 56, the nozzle acts like a safety valve, and lifts off seat 59 against spring 58 to permit excess oxygen to escape through orifices 60 into the interior of casing 10. Like all safety valves, the nozzle in so acting has a tendency to vibrate with a high pitched note, however, it has been found that the addition of a felt or leather washer 61 urged against the nozzle by spring 58 provides sufficient friction to prevent the undesirable vibrations.

The top portion of nozzle 55 is in communication with an air or mixture chamber 62 so that oxygen flow issuing from the nozzle into outlet 54, through a directing tube 63 creates a suction within the mixture chamber, drawing air therefrom to supply the mask with an air-oxygen mixture, the proportions of which are governed automatically, in accordance with changing altitudes in a manner to presently appear.

When the demand valve 41 has been unseated by diaphragm 52, in response to an inhalation at outlet 54, the oxygen flow issuing from nozzle orifice 56 sucks in air from mixture chamber 62 and this action has a tendency to cause diaphragm 52 to flutter undesirably. Such a condition results from the fact that upon inhalation at outlet 54, suction within casing 10 causes diaphragm 52 to flex inwardly and unseat demand valve 41. Oxygen is thereby caused to flow through nozzle 55 creating a suction within and drawing air from the mixture chamber. At relatively low altitudes this air has five times the volume of oxygen. There is a slight time lag between the opening of the demand valve and the addition of air, so that the diaphragm is depressed more than it need be to supply the required volume. This causes the demand valve to start to close but, as the valve is controlling only ⅕ of the total volume, an unstable condition occurs and the diaphragm tends to flutter, alternately over and under controlling.

This condition of over controlling and flutter is completely eliminated by causing push rod 44 to act as a throttle, that is, the outermost edge of button 45 is just slightly smaller than the valve seat opening of cylinder 38 and then tapered (Figure 2a) so that small initial movements of the diaphragm do not allow sudden surges of oxygen.

To the end that the desired and necessary percentage of air is available within the mixture chamber in accordance with changing altitudes so that the required proportions of an air-oxygen mixture are supplied to the consumer in accordance with his demand for changing altitudes, an aneroid 64 is arranged in a novel manner to permit entry of more air from the atmosphere to the mixture chamber at relatively low altitudes and to decrease the amount of air flow into the chamber at relatively high altitudes until a point is reached where the air flow is completely shut off and 100% of oxygen is supplied to the consumer.

Aneroid 64 is mounted within an externally threaded sleeve member 65 received by a portion of the mixture chamber having a threaded bore for this purpose. At one of its ends sleeve 65 is exposed to the atmosphere or ambient pressure through an apertured plate 66 and a suitable filter 67, both of which are carried by a shaft 68, the latter shaft having aneroid 64 secured thereto.

The lower end of sleeve member 65 is formed with a valve seat 69, one end of which is closed by a light mica or plastic disc 70 normally urged into its closed position by a relatively light spring 71 confined within a retainer clip 72, as better shown in Figure 1. Disc 70 responds to suction applied to the mixture chamber and unseats against the action of spring 71 to thereby admit air from the atmosphere to the chamber.

Due to the fact that communication between the atmosphere and the mixture chamber must be unobstructed up to 15,000 feet so that enough air can be drawn in and also because the nozzle develops a relatively high suction in the mixture chamber, it has been found that with aneroid 64 acting directly on valve seat 69 it will not give the correct percentages of air from 20,000 to 30,000 feet. Heretofore, aneroids for this purpose were designed to operate a sliding valve shaped to give the desired throttling. This arrangement was undesirable because accumulated dirt on the valve guide or frost would cause the valve to stick or freeze so that it would remain open and thus not enough oxygen could be obtained by the consumer.

To the end of overcoming the foregoing disadvantage, a throttling plate 73 having a series of openings 74 is fastened to the movable end of aneroid 64 so that the plate is forced against seat 69 at about 20,000 feet and from there on to about 27,500 feet, openings 74 are throttled down as the aneroid continues to expand against them. Between 27,500 feet and 30,000 feet the aneroid will have expanded sufficiently to seal openings 74 completely. The size of the openings and the distance of travel of plate 73 determine the percentages of the mixture in the region of 20,000 to 30,000 feet and almost any desired percentages can be obtained by slight variation in these factors.

With the use of nozzle 55 to entrain air it is obvious that some oxygen must flow to draw air into the mixture chamber. While no best fixed proportion of oxygen to air for all regulators can be stated because of the different conditions under which the regulator is used, in general the following can be considered as normal:

| Elevation, feet | Percentage added Oxygen |
| --- | --- |
| 0 | 0. |
| 5,000 | 5. |
| 10,000 | 10. |
| 15,000 | 20 to 25. |
| 20,000 | 35 to 40. |
| 25,000 | 60 to 70. |
| 30,000 | 96 to 100. |
| 33,000 | 98 to 100. |

In order for nozzle 55 to be designed for use with the present regulator it cannot have a long enough venturi to be very efficient and substantially a 20% oxygen and 80% air is about the best ratio obtainable. It is obvious that this gives more oxygen than is needed below 15,000 feet and this represents a substantial loss of oxygen.

A second aneroid 75 (Figure 1) is, therefore, provided so that oxygen is conserved at relatively low altitudes and the foregoing disadvantage is overcome. To this end casing 10 has a hollow threaded bore 76 formed therein for the reception of a threaded sleeve member 77 having a valve seat 78 which, at one end, has a light mica or plastic disc 79 cooperating therewith, the disc being loosely confined within a retainer clip 80 secured to the valve seat. The opposite end of sleeve 77 is in communication with the atmosphere through an apertured plate 81 and a filter 82, both of which are supported by a shaft 83, the latter, in turn, having one end of aneroid 75 fastened thereto. Disc 79 responds to suction applied to outlet 54 and is unseated to permit communication between casing 10 and the atmosphere, the aneroid being substantially in the position shown in Figure 1 for about 1,000 feet. As the elevation increases, pressures decrease permitting the aneroid to expand in the direction of valve seat 78 and eventually close the same around 8,000 to 10,000 feet altitude. Such provision permits the supply of enough air for normal breathing at sea level and low elevations without building up enough suction to unseat the demand valve and start oxygen flow. As the elevation increases the aneroid gradually shuts off more and more air so that oxygen starts to flow until between 10,000 and 12,000 feet all of the air enters through sleeve 65 controlled by aneroid 64.

When the regulator is to be used for rapid ascents to high altitudes it is often desirable to have the aviator breathe pure oxygen during ascent to wash nitrogen out of the blood and prevent "bends." To this end a cover 84 is provided which is mounted loosely upon a threaded shaft 85, the latter being received by a threaded bore 86 formed in the casing between sleeves 65 and 77. Loosely mounted about shaft 85 is a plate 87 having a pair of parallel guide rods 88 which cooperate with bores 89 formed in the casing as better shown in Figure 2. Secured to shaft 85 is a knob 90 which, upon rotation, moves cover 84 into sealable engagement with the casing to close off communication between the interior of the regulator and the ambient atmosphere. In actual use for normal high altitude flights, however, cover 84 is open in the manner illustrated in Figure 1.

Above 30,000 feet altitude where the consumer requires 100% of oxygen the question of mask leakage becomes critical. Due to facial differences it is practically impossible to have a mask completely tight unless it is individually tailored to the face, or a plaster cast of it. Even a very slight leak is highly dangerous at 35,000 feet and higher.

To compensate for such mask leakage, therefore, a spring adapter, generally designated at 91, is provided which can be moved into an operating position at 30,000 feet to render spring 93 effective to provide a slight spring pressure on diaphragm 52 sufficient to cause a flow of oxygen during inhalation under conditions when there is little or no differential air pressure on the diaphragm. As better shown in Figure 4, a disc 92 is provided for engaging the diaphragm and has secured thereto in a suitable manner one end of a resilient spring 93, the other end of which abuts a cover 94 provided for the open end of the casing. Fastened to the cover, through a flange 95, which serves to hold the reduced end of spring 93 in place, is a hollow cylindrical member 96 provided with diametric slots 97 therein, one of which is better illustrated in Figure 2. A knob 98 in the form of a small cylinder is telescopically received by member 96 and is provided with guide screws 99 for cooperation with slots 97 so that knob 98 is longitudinally slidable relative to member 96. Interposed between flange 95 and the closed end of knob 98 is a spring 100 and the knob is formed with a reduced and inverted cylinder 101 which receives a rod 102, the free end of which is connected with disc 92. Normally spring 100 urges knob 98 into its outermost position of Figure 2 wherein disc 92 is moved through rod 102 to its inactive position against the inside of cover 94. When it is found necessary to use the adapter, knob 98 is pushed inwardly until guide screws 99 pass into the enlarged portions of slots 97 and at which point the knob is turned sufficiently so that screws 99 engage behind the enlarged slot portions which define abutments for the guide screws to maintain the knob in its inward position. At the same time, both disc 92 and rod 102 are moved inwardly by spring 93 until the disc engages with the diaphragm to apply a slight pressure thereon as shown in Figure 4.

Adapter spring 93 is so designed that the slight pressure applied to the diaphragm by said spring may be overcome by ¼" water pressure, which is the pressure normally existing in the mask when exhaling. Upon reduction of this pressure spring 93 will flex the diaphragm inwardly and thereby cause oxygen demand valve 41 to be unseated. For this reason, during inhalation there will be no suction but there will be a free flow of oxygen and the pressure thereof will be from zero to ⅛" water pressure. When exhaling, the pressure rises to ¼" water pressure and thus shuts off the flow of oxygen because this pressure is sufficient to overcome the action of spring 93 on diaphragm 52 and permit oxygen demand valve 41 to close. This prevents any inward leakage as no suction exists and the outward leakage is exceedingly small as there is very little pressure when inhaling.

Reference is made to the graph of Figure 8 for a better understanding of the operation of the adapter and the results obtained thereby. Curve "G" illustrates the nature of the regulator output, without an adapter, for a 20 liter flow and a 1/8" leak in the mask or outlet 54. Because of the leak, the consumer, at 30,000 feet, would be supplied with about a 60% oxygen and a 40% air mixture. Such a mixture is inadequate in oxygen content and cannot increase for altitudes over 30,000 feet so that the consumer would be subject to "black out." Curve "H" illustrates the nature of the regulator output for a 30 liter flow and a 1/8" leak. Although the oxygen content of the air mixture is increased to about 85% at 30,000 feet, the mixture remains the same over 30,000 feet so that the consumer would receive a deficient supply of oxygen. Curve "I" represents the value of the regulator output for a 50 liter flow and a 1/8" leak. Here, again, the consumer would never receive the 100% of oxygen he requires for altitudes exceeding 30,000 feet. By providing adapter 91, however, the 30 liter flow and 50 liter flow curves, with the same 1/8" leak assume new positions "J" and "K." By virtue of the adapter, therefore, the consumer receives the required amount of oxygen aiding him in the proper performance of his assignments.

As better shown in Figure 3, cover 94 may be provided with a suitable dial 103 thereon having marks 104 which indicate the position that knob 90 should have assumed for either the "On" or "Off" position of cover 84. Dial 103, furthermore, may be provided with other designations 105 indicating the position that an emergency hand wheel 106 is to be turned in case the regulator fails to supply oxygen to the consumer.

Boss 16 is provided with a suitable transverse bore for the reception of a valve rod 107 having hand wheel 106 secured thereto at one of its ends and a valve 108 carried thereby at its other end for normally closing a valve seat 109 communicating with inlet passage 17. Rotation of wheel 106 unseats valve 108 from seat 109 and passage 17 is placed in communication with a passage 110 formed in the boss and casing so that oxygen is supplied to the interior of the casing and to the right of diaphragm 52. The amount of the emergency flow of oxygen may be determined by the amount of wheel rotation.

A regulator of the above-described type is usually attached to the respiratory mask by about five feet of tubing. Obviously, it is desirable for the consumer to get his oxygen supply with the minimum of effort or suction. The regulator requires about 1/4" of water suction to operate and for large flows the pressure loss in the tube will be 1/4" or more. The kinetic energy of the jet of oxygen issuing from nozzle 55 and pointing straight into outlet 54 is sufficient to more than overcome the friction loss in the outlet and connecting tube, and if not interfered with, would provide enough suction in the instrument so that the flow would not shut off when once started, without some back pressure. For this reason a small target 130 (Figure 4) is mounted in the path of the oxygen jet which dissipates enough of the jet energy so the regulator will shut off at the proper time, but leaves enough of the energy to reduce the loss in the tube and the suctions at the mask and at the outlet of the regulator are substantially the same.

Operation

In equipping a large transport or bomber, for example, a number of regulators is provided, one for supplying each personnel member. A common supply of oxygen may be used and in such a case a common tube from the supply is provided with a series of taps to which the inlet of each regulator is suitably connected. The individual regulators may be attached by way of apertured lugs 12 to a portion of the craft or may be carried by the consumer in which case the tube connecting the respiratory mask to outlet 54 need not be as long as in the case where the regulator is fastened to some part of the craft. In the case of a large craft, the personnel would not resort to the mask immediately but only when relatively high altitudes are attained. In the case of a pursuit ship, however, which after take-off climbs rapidly, the pilot will apply his respiratory mask prior to the take-off.

Below and up to 8,000 to 10,000 feet the oxygen content of the air is sufficient for normal breathing so that the pilot does not need an artificial supply of oxygen. In response to his breathing, therefore, with each inhalation, disc 79, being unconstrained in any manner, is unseated from valve seat 78 and air from the ambient atmosphere passes into casing 10 and to the mask through outlet 54. Insufficient suction is generated within the casing to flex diaphragm 52 to open demand valve 41. However, as soon as the craft attains an altitude of 10,000 to 12,000 feet, aneroid 75 expands sufficiently to close valve seat 78 and shut off communication with the casing. Upon this occurrence, the suction generated by an inhalation acts to flex diaphragm 52 inwardly whereupon demand valve 41 is unseated and oxygen from the demand chamber flows through passage 43 into nozzle 55. The oxygen jet issuing from nozzle orifice 56 creates a suction in the mixture chamber 62 which is sufficient to unseat disc 70 from seat 69 to pass air from the ambient atmosphere into the mixture chamber which is drawn into the outlet 54 and to the mask.

With the depletion of oxygen from the demand chamber, the oxygen from the pressure reduction chamber 13 passes thereto lowering the pressure within chamber 13 in response to which bellows 26 expands and pivots bell-crank 22 away from inlet valve 18 which is then raised by the pressure of the oxygen within passage 17. The pressure within the reduction chamber is thereby increased causing bellows 26 to contract and swing bell-crank 22 to seat and close valve 18.

As the altitude is increased aneroid 64 continues to expand until throttling plate 73 rests against valve seat 69. At the same time, the percentage of air passing into the mixture chamber is progressively decreased so that the ratio of the oxygen in the mixture is correspondingly increased. With continued increase in altitude, aneroid 64 expands sufficiently to close off orifices 74 of plate 73 at which time 100% oxygen is supplied to the user. If flight continues to exceed 30,000 feet, the consumer places adapter 91 into operation by pushing knob 98 inwardly whereupon spring 93 urges disc 92 into engagement with diaphragm 52 whereby the slight spring pressure applied to the diaphragm unseats demand valve 41 subsequent to an exhalation and oxygen is supplied automatically to the consumer during the inhalation thus overcoming the danger otherwise present because of mask leakage at such high altitudes.

Instead of adapter 91, the same function may be performed by somewhat simpler arrangement as shown in Figures 6 and 7. In all respects the regulator is the same as the regulator of the preceding figures and thus like reference characters have been used to designate like parts. In place of spring 93, a flat leaf spring 120 is provided which is anchored at one end to the casing by means of screws 121 and the free end of which contacts a small pin 122 carried by lever 49. The slight pressure required for displacing push rod 44 to unseat oxygen demand valve 41, instead of being applied directly to the diaphragm 52 is, in this instant, applied to the lever 49 with substantially the same result. As shown in Figure 7, leaf spring 120 is held in its inactive position by cam 123. The spring is brought into an operating position (shown in dotted lines in Figure 7) by displacing a cam element 123 carried by a shaft 124, journalled within a bearing 125, and having an operating hand lever 126 exterior of the casing. Rotation of lever 126 in one direction, against a stop member 127 provided on the casing, causes the cam to support spring 120 in inactive position while rotation of the lever in an opposite direction, against a second stop member 128, likewise provided on the casing, releases the spring and permits it to exert pressure on pin 122 and lever 49 to cause displacement of oxygen demand valve 41 during inhalation.

Although the present invention has been illustrated and described in detail, various changes in the form and relative arrangement of parts, which will now appear to those skilled in the art, may be made without departing from the scope of the invention. Reference is, therefore, to be had to the appended claims for a definition of the limits of the invention.

I claim:

1. In a demand regulator for use on aircraft traversing a wide range altitudes, a casing having an inlet adapted for connection to a source of oxygen and an outlet, a mixture chamber within said casing, injector means communicating with said chamber and said outlet, a demand valve for controlling oxygen flow through said injector means whereby a suction is developed within said chamber, means for admitting air from the ambient atmosphere to said casing operated by a suction applied to said outlet, aneroid means responsive to changes in altitude for controlling the amount of air flowing to said casing during the operation of said admitting means and closing off said air flow at a predetermined altitude, a flexible diaphragm mounted within said casing and responding to a suction applied to said outlet when said aneroid means has closed off said air flow for operating said valve whereby oxygen flows through said injector means, means operated by the suction developed in said chamber for admitting air from the ambient atmosphere to said mixture chamber whereby an air and oxygen mixture is provided at said outlet, and second aneroid means responsive to change in altitude for variably controlling the amount of air flowing to said chamber during the operation of said last-named admitting means and closing off such air flow at a second predetermined altitude.

2. A demand regulator for use on aircraft traversing a wide range of altitudes comprising a casing having an inlet adapted for connection to a source of oxygen and an outlet, a pressure reduction chamber within said casing and having a controllable communication with said inlet, a mixture chamber within said casing, a flow injector member communicating with said mixture chamber and said outlet, a demand chamber adapted for communication with said injector member and connected with said pressure reduction chamber, a demand valve controlling communication between said demand chamber and said injector member, an unconstrained suction valve for admitting air from the ambient atmosphere to said casing operated by a suction applied to said outlet, an aneroid responsive to changes in altitude for controlling the amount of air flowing to said casing during the operation of said suction valve and closing off said air flow at a predetermined altitude, a flexible diaphragm mounted within said casing and responding to a suction applied to said outlet when said aneroid has closed off air flow to said casing for operating said demand valve whereby oxygen flows through said injector member to provide a suction within said mixing chamber, a resiliently constrained valve operated by the suction developed in said mixture chamber for admitting air from the ambient atmosphere to said mixture chamber whereby an air and oxygen mixture is provided at said outlet, and a second aneroid responsive to changes in altitude exceeding said predetermined altitude for variably controlling the amount of air flowing to said mixture chamber during the operation of said last-named valve and closing off such air flow at a second predetermined altitude.

3. In a demand regulator adapted for use on aircraft traversing a wide range of altitudes, a first control for supplying air to the consumer during one range of altitudes and closing off the air supply at a predetermined altitude, a second control for supplying predetermined air-oxygen mixtures for altitudes exceeding said predetermined altitude until a second predetermined altitude has been reached, when only pure oxygen is available to said consumer, said first and second controls responding to a suction applied to said regulator, and a third control means adapted for supplying a positive flow of pure oxygen to said consumer independently of suction applied to said regulator for altitudes exceeding said second predetermined altitude.

4. A demand regulator comprising a casing having an inlet adapted for connection with a source of respirant gas and an outlet, a mixture chamber provided within said casing, a nozzle communicating with said chamber and said outlet, means for controlling gas flow to said nozzle whereby a suction is developed within said mixture chamber, a resilient member responding to a suction applied to said outlet for operating said control means whereby gas flows to said nozzle, means defining an air passage having an inlet and an outlet providing a flow of air from the exterior of said casing to said chamber, means comprising a resiliently constrained disc valve for controlling the outlet of said air passage, said disc valve being controlled independently of forces external of said regulator and displaceable by the suction developed within said mixture chamber, and valve means responsive to ambient pressure for controlling the inlet of said air passage.

5. A demand regulator comprising a casing having an inlet adapted for connection with a source of respirant gas and an outlet, a mixture chamber provided within said casing, a nozzle communicating with said chamber and said outlet, a demand valve for controlling gas flow to said nozzle whereby a suction is developed within said chamber, a flexible diaphragm responding to a suction applied to said outlet for operating said valve whereby gas flows to said nozzle, means including an air passage having an inlet and an outlet providing for a flow of air from the exterior of said casing to said chamber, a resiliently constrained valve operated by the suction developed within said chamber for controlling the outlet of said air passage between the exterior of the casing and said chamber, said resiliently controlled valve being controlled independent of forces external of said regulator, and expansible and contractible means for controlling the inlet of said air passage to thereby control the amount of air passing through said air passage.

6. A demand regulator comprising a casing having an inlet adapted for connection with a source of oxygen and an outlet, a mixture chamber provided within said casing, flow inducing means communicating with said mixture chamber and said outlet, a demand valve for controlling oxygen flow through said inducing means, a resilient member responding to a suction applied to said outlet for operating said valve whereby oxygen flows through said inducing means thereby developing a suction within said chamber, means communicating with said mixture chamber for controlling a flow of air from the exterior of the casing to said mixture chamber in response to the suction developed within said mixture chamber, said communicating means including an air passage having an inlet and an outlet, a valve and valve seat for the outlet of said air passage, said valve being controlled independently of forces external of said regulator, and ambient pressure responsive means for controlling the inlet of said air passage to thereby control the amount of air flowing through said air passage.

7. A demand regulator comprising a casing having an inlet adapted for connection with a source of oxygen and an outlet, a mixture chamber within said casing, an injector nozzle communicating with said chamber and said outlet, a demand valve for controlling oxygen flow through said nozzle, a resilient member responding to a suction applied to said outlet for operating said valve whereby oxygen flows through said nozzle thereby developing a suction within said chamber, an air passage having an inlet in communication with the ambient atmosphere and an outlet in communication with said chamber, means for controlling the outlet of said air passage and operated by the suction developed in said chamber for admitting air from the ambient atmosphere to said mixture chamber, a throttling member associated with the inlet of said air passage, said air-admitting means being controlled independently of forces external of said regulator, and expansible and contractible means responsive to changes in ambient pressure for actuating said throttling member to variably control the inlet of said air passage and thereby variably control the amount of air passed to said chamber by said admitting means.

8. A demand regulator comprising a casing having an inlet adapted for connection with a source of oxygen and an outlet, a mixture chamber within said casing, an injector nozzle communicating with said chamber and said outlet, a demand valve for controlling oxygen flow through said nozzle, a resilient member responding to a suction applied to said outlet for operating said valve whereby oxygen flows through said nozzle thereby developing a suction within said chamber, an air passage having an inlet in communication with the ambient atmosphere and an outlet in communication with said chamber a resiliently constrained valve associated with and controlling the outlet of said air passage and operated by the suction developed in said chamber for admitting air from the ambient atmosphere to said mixture chamber, said resiliently constrained valve being independent of forces external of said regulator, a throttling member associated with and controlling the inlet of said air passage, and aneroid means responsive to changes in ambient pressure for actuating said throttling member to variably control the inlet of said air passage and thereby variably control the amount of air passed to said chamber by said last-named valve.

9. In a demand regulator adapted for use on aircraft traversing a wide range of altitudes, the combination comprising a casing having an inlet adapted for connection with a source of oxygen and an outlet, a mixture chamber within said casing, flow inducing means communicating with said chamber and said outlet, a demand valve for controlling oxygen flow through said inducing means, a diaphragm responsive to differential pressure from without and within said casing, means operatively connected with said diaphragm for actuating said demand valve, means for regulating admission of air to said mixture chamber, means for providing a positive flow of oxygen through said flow inducing means comprising spring means normally out of contact with said diaphragm but adapted to be placed in association therewith for exerting yielding pressure on said diaphragm to unseat said oxygen demand valve when due to increased altitude the differential pressure on said diaphragm is insufficient to do so, and means for rendering said spring means effective for association with said diaphragm.

10. In a demand regulator adapted for use on aircraft traversing a wide range of altitudes, the combination comprising a casing having an inlet adapted for connection with a source of oxygen and an outlet, a mixture chamber within said casing, flow inducing means communicating with said chamber and said outlet, a demand valve for controlling oxygen flow through said inducing means, a diaphragm responsive to differential pressure from without and within said casing, means for regulating admission of air to said mixture chamber, means operatively connected with said diaphragm for actuating said demand valve, means for providing a positive flow of oxygen through said flow inducing means comprising spring means normally out of contact with said last-named means but adapted to be placed in association therewith for unseating said oxygen demand valve when due to increased altitude the differential pressure on said diaphragm is insufficient to do so, and means for rendering said spring means effective for association with said valve actuating means.

11. In a demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, pressure responsive means responsive to suction in said casing for unseating said valve, first control means operable for admitting air from the ambient atmosphere to said casing in response to suction applied at said outlet and for closing off air to said casing at a predetermined altitude, second control means operable at altitudes at or above said predetermined altitude, for admitting air from the ambient atmosphere to said mixture chamber in response to suction applied at said outlet and for closing off air to said mixture chamber above a higher predetermined altitude, and third control means operable upon said pressure responsive means for operating said oxygen demand valve after said first and second control means have closed off and the suction necessary for operating said pressure responsive means is less than that necessary for unseating said oxygen demand valve.

12. In a demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, pressure responsive means responsive to suction in said casing for unseating said valve, first control means operable for admitting air from the ambient atmosphere to said casing in response to suction applied at said outlet and for closing off air to said casing at a predetermined altitude, and second control means operable at altitudes at or above said predetermined altitude for admitting air from the ambient atmosphere to said mixture chamber in response to suction applied at said outlet and for closing off air to said mixture chamber above a higher predetermined altitude.

13. In a demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, pressure responsive means responsive to suction in said casing for unseating said valve, first control means operable for admitting air from the ambient atmosphere to said casing in response to suction applied at said outlet and for closing off air to said casing at a predetermined altitude, second control means operable at altitudes at or above said predetermined altitude for admitting air from the ambient atmosphere to said mixture chamber in response to suction applied at said outlet and for closing off air to said mixture chamber above a higher predetermined altitude, and manually operable means for closing off said first and second control means from the ambient atmosphere, at will, whereby the full suction in said regulator is available for operating said pressure responsive means to unseat said demand valve and thereby provide pure oxygen to said outlet.

14. A demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, a resilient member responding to suction applied to said outlet for operating said valve whereby oxygen flows through said inducing means, an air passage for admitting air from the ambient atmosphere to said mixture chamber, a resiliently supported valve responsive to suction in said mixture chamber for controlling the passage of air through said air passage, expansible and contractible means responsive to changes in ambient pressure for variably controlling the amount of air flowing through said air passage and for closing off air flow through said air passage, a second air passage in said casing for admitting air to said casing, expansible and contractible means responsive to changes in ambient pressure for closing said second air passage before said first-mentioned air passage is closed during ascending altitude, a cover adapted to seal off access of ambient atmosphere to the both of said air passages, and means for moving said cover to seal the same against said casing for effecting said sealing off.

15. A demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, a resilient member responding to suction applied to said outlet for operating said valve whereby oxygen flows through said inducing means, an air passage for admitting air from the ambient atmosphere directly to said mixture chamber, a resiliently supported valve responsive to suction in said mixture chamber for controlling the passage of air through said air passage, expansible and contractible means responsive to changes in ambient pressure for variably controlling the amount of air flowing through said air passage and for closing off air flow through said air passage when the pressure of the ambient atmosphere drops to a predetermined value, a second air passage in said casing for admitting air directly to said outlet and without passing through said mixture chamber, expansible and contractible means responsive to changes in ambient pressure for closing said second air passage when the pressure of the ambient atmosphere is greater than said predetermined value whereby, before said second air passage is closed during ascending altitude, the suction at said outlet is maintained less than sufficient to flex said resilient member and unseat said oxygen demand valve and oxygen is conserved at low altitudes.

16. A demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, a resilient member responding to a suction applied to said outlet for operating said valve whereby oxygen flows through said inducing means, an air passage for admitting air from the ambient atmosphere directly to said mixture chamber, a resiliently supported valve responsive to suction in said mixture chamber for controlling the passage of air through said air passage, expansible and contractible means responsive to changes in ambient pressure, a throttling plate actuated by said last-named means for variably controlling the amount of air flowing through said air passage, said throttling plate having openings therein to pass air, and being adapted to be sealed by said expansible and contractible means for closing off air flow through said air passage when the ambient pressure drops to a predetermined value.

17. A demand regulator comprising a casing having an inlet adapted for use with a source of respirant gas and an outlet, a mixture chamber provided within said casing, a nozzle communicating with said chamber and said outlet, a demand valve for controlling gas flow to said nozzle whereby suction is developed within said chamber, a flexible diaphragm responsive to suction applied to said outlet for operating said valve whereby gas flows to said nozzle, a valve for admitting air to said chamber, said valve including a perforated valve-disc movable in a direction substantially normal to a valve seat for controlling the amount of air passing through said valve, and expansible and contractible means for controlling the position of said perforated valve-disc with respect to said valve seat and for holding said disc against said valve seat for reducing the passage of air through said valve at a predetermined altitude, said expansible and contractible means sealing said perforated valve-disc to prevent the passage of air therethrough at a higher predetermined altitude.

18. A demand regulator comprising a casing having an inlet adapted for use with a source of respirant gas and an outlet, a mixture chamber provided within said casing, a nozzle communicating with said chamber and said outlet, a demand valve for controlling gas flow to said nozzle whereby suction is developed within said chamber, a flexible diaphragm responsive to suction applied to said outlet for operating said valve whereby gas flows to said nozzle, a valve for admitting air to said chamber, said valve including a valve-disc movable in a direction substantially normal to a valve seat for controlling the amount of air passing through said valve, said valve-disc being perforated to allow air to pass therethrough, and expansible and contractible means for moving said valve-disc towards said valve seat to effect reduction of air flow through said valve and to close off perforations in said valve-disc to prevent passage of any air through said valve.

19. In a demand regulator for use on aircraft traversing a wide range of altitudes, a casing having an inlet adapted for connection to a source of oxygen and an outlet, a mixture chamber within said casing, flow inducing means communicating with said chamber and said outlet, a valve for controlling oxygen flow through said inducing means whereby a suction is developed within said chamber, means for admitting air from the ambient atmosphere to said casing operated by a suction applied to said outlet, expansible and contractible means responsive to changes in altitude for controlling the amount of air flowing to said casing during the operation of said admitting means and closing off said air flow at a predetermined altitude, a resilient member mounted within said casing and responding to a suction applied to said outlet when said last-named means has closed off said air flow for operating said valve whereby oxygen flows through said inducing means, means operated by the suction developed in said chamber for admitting air from the ambient atmosphere to said mixture chamber whereby an air and oxygen mixture is provided at said outlet, a second expansible and contractible means responsive to changes in altitude exceeding said predetermined altitude for variably controlling the amount of air flowing to said chamber during the operation of said last-named admitting means and closing off such air flow at a second predetermined altitude, and means for applying a tension on said valve for altitudes exceeding said second predetermined altitude.

20. In a demand regulator for use on aircraft traversing a wide range of altitudes, a casing having an inlet adapted for connection to a source of oxygen and an outlet, a mixture chamber within said casing, flow inducing means communicating with said chamber and said outlet, a valve for controlling oxygen flow through said inducing means whereby a suction is developed within said chamber, means for admitting air from the ambient atmosphere to said casing operated by a suction applied to said outlet, expansible and contractible means responsive to changes in altitude for controlling the amount of air flowing to said casing during the operation of said admitting means and closing off said air flow at a predetermined altitude, a resilient member mounted within said casing and responding to a suction applied to said outlet when said last-named means has closed off said air flow for operating said valve whereby oxygen flows through said inducing means, means operated by the suction developed in said chamber for admitting air from the ambient atmosphere to said mixture chamber whereby an air and oxygen mixture is provided at said outlet, and a second expansible and contractible means responsive to changes in altitudes exceeding said predetermined altitude for variably controlling the amount of air flowing to said chamber during the operation of said last-named admitting means and closing off such air flow at a second predetermined altitude.

21. In a demand regulator for use on aircraft traversing a wide range of altitudes, a casing having an inlet adapted for connection to a source of oxygen and an outlet, a mixture chamber within said casing, flow inducing means communicating with said chamber and said outlet, a valve for controlling oxygen flow through said inducing means whereby a suction is developed within said chamber, means for admitting air from the ambient atmosphere to said casing operated by a suction applied to said outlet, expansible and contractible means responsive to changes in altitude for controlling the amount of air flowing to said casing during the operation of said admitting means and closing off said air flow at a predetermined altitude, a resilient diaphragm mounted within said casing and responding to a suction applied to said outlet when said last-named means has closed off said air flow for operating said valve whereby oxygen flows through said inducing means, means operated by the suction developed in said chamber for admitting air from the ambient atmosphere to said mixture chamber whereby an air and oxygen mixture is provided at said outlet, a second expansible and contractible means responsive to changes in altitude exceeding said predetermined altitude for variably controlling the amount of air flowing to said chamber during the operation of said last-named admitting means and closing off such air flow at a second predetermined altitude, and means for applying a tension on said diaphragm for altitudes exceeding said second predetermined altitude.

22. In a demand regulator for use on aircraft traversing a wide range of altitudes, a casing having an inlet adapted for connection to a source of oxygen and an outlet, a mixture chamber within said casing, flow inducing means communicating with said chamber and said outlet, a demand valve for controlling oxygen flow through said inducing means whereby a suction is developed within said chamber, an unconstrained suction valve for admitting air from the ambient atmosphere to said casing operated by a suction applied to said outlet, expansible and contractible means responsive to changes in altitude for controlling the amount of air flowing to said casing during the operation of said suction valve and closing off said air flow at a predetermined altitude, a flexible diaphragm mounted within said casing and responding to a suction applied to said outlet when said last-named means has closed off air flow for operating said demand valve whereby oxygen flows through said inducing means, an operating linkage connecting said diaphragm and said demand valve, a resiliently constrained valve operated by the suction developed in said chamber for admitting air from the ambient atmosphere to said mixture chamber whereby an air and oxygen mixture is provided at said outlet, a second expansible and contractible means responsive to changes in altitude exceeding said predetermined altitude for variably controlling the amount of air flowing to said chamber during the operation of said constrained valve and closing off such air flow at a second predetermined altitude, and resilient means for engaging and urging said linkage to operate said demand valve.

23. A demand regulator comprising a casing having an inlet adapted for connection with a source of oxygen and an outlet, a mixture chamber within said casing, flow inducing means communicating with said chamber and said outlet, a demand valve for controlling oxygen flow through said inducing means, a resilient member responding to a suction applied to said outlet for operating said valve whereby oxygen flows through said inducing means thereby developing a suction within said chamber, valve means operated by the suction developed in said chamber for admitting air from the ambient atmosphere to said mixture chamber, expansible and contractible means responsive to changes in ambient pressure for variably controlling the amount of air flowing to said chamber through said last-named valve means and closing off such air flow when the ambient pressure drops to a predetermined value, and an adapter comprising resilient means connected to said demand valve independently of said resilient member and settable for yieldingly unseating said demand valve irrespective of the degree of minimum suction applied to said outlet at ambient pressures less than said predetermined value and settable for closing said demand valve at values higher than said predetermined value.

24. A demand regulator comprising a casing having an inlet adapted for connection with a source of oxygen and an outlet, a mixture chamber within said casing, inducing flow means communicating with said chamber and said outlet, a demand valve for controlling oxygen flow through said means, a resilient member responding to a suction applied to said outlet for operating said valve whereby oxygen flows through said flow inducing means thereby developing a suction within said chamber, means operated by the suction developed in said chamber for admitting air from the ambient atmosphere to said mixture chamber, expansible and contractible means responsive to changes in ambient pressure for variably controlling the amount of air flowing through said last-named means and closing off such air flow when the ambient pressure drops to a predetermined value, and an adapter comprising resilient means for engaging said resilient member whereby said demand valve is unseated automatically irrespective of degree of minimum suction applied to said outlet at ambient pressures less than said predetermined value, and means normally operative to hold said resilient means disengaged from said resilient member at ambient pressures greater than said predetermined value.

BRADFORD B. HOLMES.

REFERENCES CITED

The following references are of record in the file of this patent:

UNITED STATES PATENTS

| Number | Name | Date |
|---|---|---|
| Re. 16,071 | Dorsey | May 19, 1925 |
| 744,297 | Cook | Nov. 17, 1903 |
| 744,679 | Cook | Nov. 17, 1903 |
| 1,298,935 | Hanman | Apr. 1, 1919 |
| 2,269,500 | Wildhack | Jan. 13, 1942 |
| 2,308,124 | Stettner | Jan. 12, 1943 |
| 2,378,047 | Strange | June 12, 1945 |

FOREIGN PATENTS

| Number | Country | Date |
|---|---|---|
| 5,115 | France | of 1905 |
| 439,183 | Great Britain | of 1935 |
| 456,066 | Great Britain | of 1936 |